UNITED STATES PATENT OFFICE.

OSCAR HOMMEL, OF PITTSBURGH, PENNSYLVANIA.

COATING MATERIAL.

1,419,258.  Specification of Letters Patent.  Patented June 13, 1922.

No Drawing. Application filed April 21, 1919, Serial No. 291,560. Renewed January 20, 1922. Serial No. 530,726.

*To all whom it may concern:*

Be it known that I, OSCAR HOMMEL, residing at Pittsburgh, in the county of Allegheny and State of Pennsylvania, a citizen of the United States, have invented or discovered certain new and useful Improvements in Coating Materials, of which improvements the following is a specification.

It is the custom to cover the surfaces of golf balls with a white varnish which will not harden sufficiently to permit the use of the balls under several days. This long period of hardening is not particularly objectionable in a factory where the balls are produced and facilities are had for caring for the balls while the varnish is drying and hardening. But such a long delay is very objectionable when it becomes necessary for the golf player to whiten the balls. And further, a varnish coating is objectionable for the reason that it will become soft and sticky in hot weather.

The object of the invention described herein is to provide a coating which can be applied by merely dipping the ball in the material which is so liquid that all surplus will drain off very rapidly, leaving a thin brilliantly white coating on the ball, and which will become sufficiently hard to permit of the use of the ball in about an hour from the time it was dipped.

In the practice of the invention, one part of soluble cotton is dissolved in twenty parts of a suitable solvent such as amylacetate fusel oil, etc.; when the soluble cotton has become dissolved, seven and one-half parts of a suitable pigment dependent upon the color of the coating desired is added to the solution. For golf balls a white coating is generally preferred and hence white pigment as flake white, lithopone or Chinese white is added to the solution.

In order to render a coating of such material sufficiently tough and elastic, a suitable gum which will not prevent the hardening of a coating, is added. A large number of substances generically known as gums, can be employed, but in adding the gum only such amounts should be used as will produce the desired toughness and elasticity without reducing the liquidity of the material. When employing dammar varnish, an amount equal to about ten percent (10%) of the mixture hereinbefore described will produce the desired character of coating without interfering with quick hardening. When rubber cement is used, three percent (3%) of the total mixture will be found sufficient to impart to the coating the desired toughness and elasticity.

In order to make the balls conspicuous when snow is on the ground, a dark pigment such as geranium lake and anilines, French carmine or other suitable dark pigment may be employed in preparing the coating.

I claim herein as my invention:

1. A quick drying material for coating golf balls adapted to be applied by dipping, consisting of soluble cotton, a solvent for the cotton, a pigment and a gum in substantially the proportions herein specified.

2. A quick drying material for coating golf balls and adapted to be applied by dipping the ball therein consisting of soluble cotton, a solvent for the cotton, a white pigment and dammar varnish in substantially the proportions specified herein.

In testimony whereof, I have hereunto set my hand.

OSCAR HOMMEL